US007305834B2

(12) United States Patent
Bhatti

(10) Patent No.: US 7,305,834 B2
(45) Date of Patent: Dec. 11, 2007

(54) VORTEX TUBE COOLER

(75) Inventor: Mohinder Singh Bhatti, Amherst, NY (US)

(73) Assignee: Delphi Technologies, Inc, Troy, MI (US)

( * ) Notice: Subject to any disclaimer, the term of this patent is extended or adjusted under 35 U.S.C. 154(b) by 401 days.

(21) Appl. No.: 11/040,671

(22) Filed: Jan. 21, 2005

(65) Prior Publication Data

US 2006/0162345 A1 Jul. 27, 2006

(51) Int. Cl.

*F25B 9/02* (2006.01)
*B60H 1/32* (2006.01)
*F17C 13/00* (2006.01)

(52) U.S. Cl. .............................. 62/5; 62/239; 62/457.9

(58) Field of Classification Search ...................... 62/5, 62/239, 457.9

See application file for complete search history.

(56) References Cited

U.S. PATENT DOCUMENTS

| | | | | |
|---|---|---|---|---|
| 1,952,281 A | | 3/1934 | Ranque | 62/170 |
| 2,770,103 A | * | 11/1956 | Florea | 62/5 |
| 2,873,582 A | * | 2/1959 | Green | 62/5 |
| 3,027,726 A | * | 4/1962 | Green | 62/5 |
| 3,630,039 A | * | 12/1971 | Hayashi | 62/5 |
| 4,584,838 A | * | 4/1986 | AbuJudom, II | 62/5 |
| 5,007,248 A | * | 4/1991 | Maier et al. | 62/244 |
| 5,010,736 A | * | 4/1991 | York et al. | 62/5 |
| 5,205,126 A | * | 4/1993 | Schnurr et al. | 62/5 |
| 5,572,872 A | * | 11/1996 | Hlavacek | 62/3.6 |
| 5,819,541 A | | 10/1998 | Tunkel | 62/5 |
| 5,950,436 A | | 9/1999 | Tunkel | 62/5 |
| 6,092,381 A | * | 7/2000 | Hsiao et al. | 62/237 |

* cited by examiner

*Primary Examiner*—William C Doerrler
(74) *Attorney, Agent, or Firm*—Patrick M. Griffin

(57) ABSTRACT

The invention provides an apparatus for moving thermal energy with respect to at least one of a beverage and a food product positioned in a vehicle or a stationary beverage machine. The apparatus includes a vortex tube positionable in a vehicle or a stationary beverage machine. The vortex tube includes an inlet and a cold outlet and a hot outlet. The vortex tube divides a primary air stream received in the inlet into a cold air sub-stream exiting the cold outlet and an a hot air sub-stream exiting the hot outlet. The apparatus also includes a containing member having a first wall with an inner surface for receiving a product. The containing member also includes a second wall surrounding the first wall to define a first cavity. The apparatus also includes a first fluid line extending between the first cavity and one of the cold and hot outlets for communicating one of the cold and hot air sub-streams to the first cavity. The apparatus also includes a third wall disposed between the first and second walls for dividing the first cavity into outer sub-cavity for receiving the air sub-stream and an inner sub-cavity for receiving a thermal fluid.

7 Claims, 1 Drawing Sheet

VORTEX TUBE COOLER

FIELD OF THE INVENTION

The invention relates to a vortex cooler positionable in a vehicle or a stationary beverage machine.

BACKGROUND OF THE INVENTION

A vortex tube can divide a primary air stream into a cold air sub-stream and a hot air sub-stream. The origin of the vortex tube can be traced to a Frenchman named Georges Joseph Ranque. Mr. Ranque filed for a French patent on Dec. 12, 1931, and also secured U.S. Pat. No. 1,952,281 on Mar. 27, 1934. The application of a vortex tube to cooling system for a vehicle is disclosed in U.S. Pat. Nos. 5,819,541 and 5,950,436.

SUMMARY OF THE INVENTION AND ADVANTAGES

The invention provides an apparatus for moving thermal energy with respect to at least one of a beverage and a food product positioned in a vehicle or a stationary beverage machine. The apparatus includes a vortex tube positionable in a vehicle or a stationary beverage machine. The vortex tube includes an inlet and a cold outlet and a hot outlet. The vortex tube divides a primary air stream received in the inlet into a cold air sub-stream exiting the cold outlet and an a hot air sub-stream exiting the hot outlet. The apparatus also includes a containing member having a first wall with an inner surface for receiving a product. The containing member also includes a second wall surrounding the first wall to define a first cavity. The apparatus also includes a first fluid line extending between the first cavity and one of the cold and hot outlets for communicating one of the cold and hot air sub-streams to the first cavity. The apparatus also includes a third wall disposed between the first and second walls for dividing the first cavity into outer sub-cavity for receiving the air sub-stream and an inner sub-cavity for receiving a thermal fluid.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
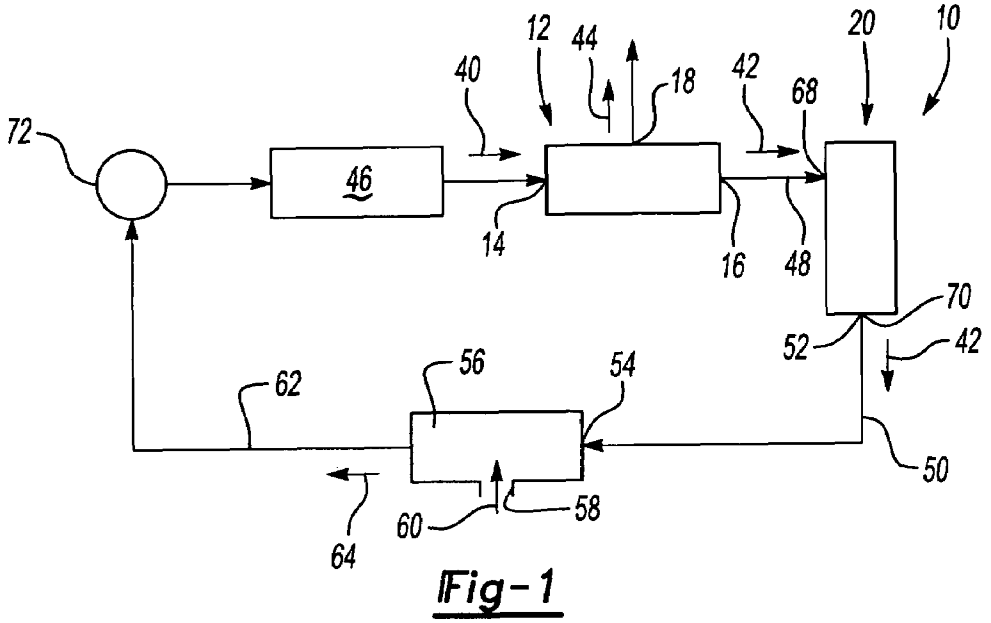
FIG. 1 is a schematic view of an exemplary embodiment of the inventive apparatus.
Figure 2:
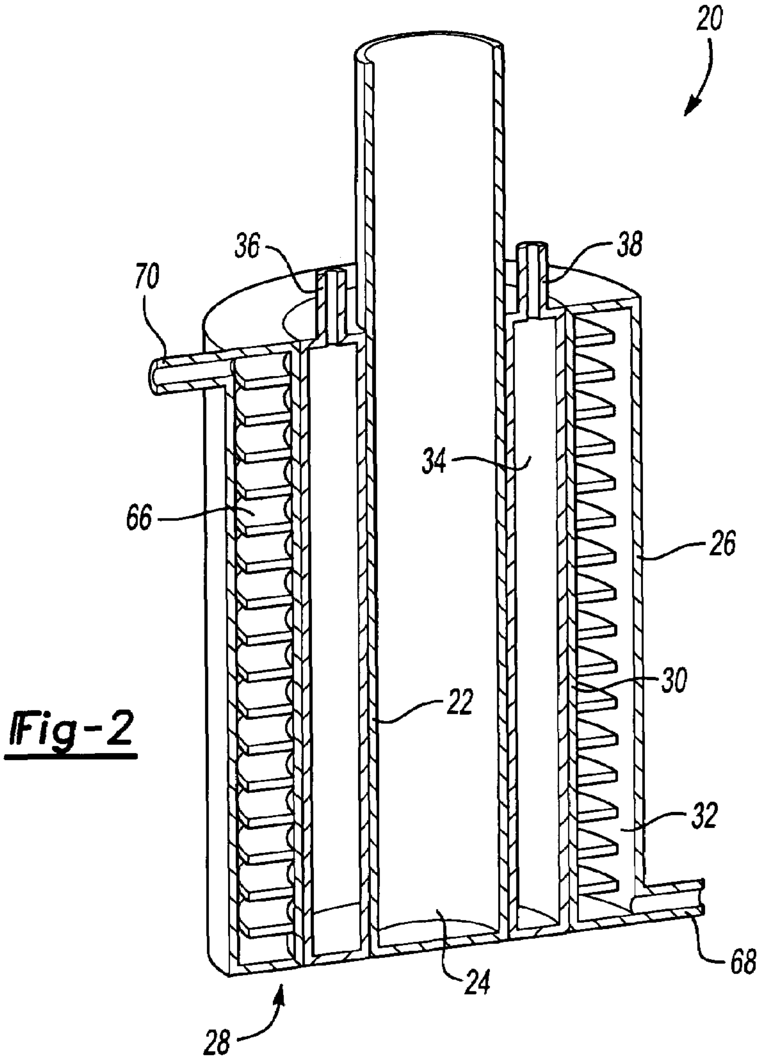
FIG. 2 is a perspective cross-sectional view of a containing member according to the exemplary embodiment of the invention.

An apparatus 10 for moving thermal energy with respect to at least one of a beverage and a food product is positionable in a vehicle or a stationary beverage machine. The apparatus 10 includes a vortex tube 12 positionable in a vehicle or a stationary beverage machine. The vortex tube 12 includes an inlet 14 and a cold outlet 16 and a hot outlet 18. The vortex tube 12 divides a primary air stream 40 received in the inlet 14 into a cold air sub-stream 42 exiting the cold outlet 16 and an a hot air sub-stream 44 exiting the hot outlet 18. The apparatus 10 also includes a containing member 20 having a first wall 22 with an inner surface 24 for receiving a product. The bottom of the inner surface 24 may be fitted with a lid to facilitate dispensing of the beverage cans fed from the top for cooling or heating. The containing member 20 also includes a second wall 26 surrounding the first wall 22 to define a first cavity 28.

The apparatus 10 also includes a first fluid line 48 extending between the first cavity 28 and one of the cold and hot outlets 16, 18 for communicating one of the cold and hot air sub-streams 42, 44 to the first cavity 28. In the exemplary embodiment of the invention, the cold air sub-stream 42 is directed to the containing member 20 to cool a beverage and the hot air sub-stream 44 is released to the environment. However, in alternative embodiments of the invention, both of the air sub-streams 42, 44 could be directed to separate containing members, each being similar to the containing member 20. In another alternative embodiment of the invention, the hot air sub-stream 44 could be directed to the containing member 20 to heat a beverage. In other alternative embodiments of the invention, one of the air sub-streams 42, 44 could be directed to cool or heat, respectively, a food product disposed in the containing member 20.

The apparatus 10 also includes a third wall 30 disposed between the first and second walls 22, 26 for dividing the first cavity 28 into outer sub-cavity 32 for receiving the air sub-stream 42, 44 and an inner sub-cavity 34 for receiving a thermal fluid. The thermal fluid can be a brine of water and salt or any other fluid. Preferably the brine disposed in the inner sub-cavity 34 has a relatively high thermal inertia. The brine enhances the transfer of thermal energy over a system utilizing only an air sub-stream by cooperating with the air sub-stream to expedite thermal transfer. The brine can be relatively stationary with respect to the containing member 20, or, in other words, static or non-flowing. A reservoir (not shown) can communicate additional brine to the inner sub-cavity 34 if necessary.

The containing member 20 of the exemplary embodiment includes an opening 36 communicating with the inner sub-cavity 34 for directing the fluid to the inner sub-cavity 34. The containing member 20 also includes an exit port 38 spaced from the first inlet 14. The exit port 38 communicates with the inner sub-cavity 34 for directing the fluid from the inner sub-cavity 34. Preferably, the opening 36 and exit port 38 are disposed on opposite sides of the containing member 20. The opening 36 and exit port 38 can extend from the containing member 20 vertically, as shown in the exemplary embodiment, or one or both can extend horizontally with respect to the containing member 20.

The apparatus 10 can also include a second inlet 68 communicates with the outer sub-cavity 32 for directing the received air sub-stream 42 to the outer sub-cavity 32. A second outlet 70 is spaced from the second inlet 68 and communicates with the outer sub-cavity 32 to direct the received air sub-stream 42 from the outer sub-cavity 32. A helical fin 66 extending around the third wall 30 in the outer sub-cavity 32 and directs the received air sub-stream 42 between the second inlet 68 and the second outlet 70.

The apparatus 10 can also include a water separator 46 operably disposed upstream of the inlet 14 to remove water from the primary air stream 40. If the primary air stream 40 is relatively humid, ice can form in the vortex tube 12. The water separator 46 reduces the likelihood of ice formation, enhancing the operation of the apparatus 10.

The apparatus 10 can also include a second fluid line 50. The second fluid line 50 extends from a first end 52 at the containing member 20 to a second end 54. The second fluid line 50 communicates the received air sub-stream 42 from the outer sub-cavity 32. A mixing chamber 56 engaged with the second fluid line 50 of the exemplary embodiment at the second end 54. The mixing chamber 56 receives the received air sub-stream 42. The mixing chamber 56 includes an aperture 58 communicating with ambient air 60. Ambient air 60 mixes with the received air sub-stream 42 in the mixing chamber to form a mixture 64. A third fluid line 62 extends away from the mixing chamber 56 and communicates the mixture 64 of ambient air 60 and the received sub-stream 42 to the inlet 14.

The apparatus 10 can also include an air directing device 72 operably connected to the vortex tube 12. The air directing device 72 directs the primary air stream 40 to the inlet 14 of the vortex tube 12. The air directing device 72 can be a compressor mountable in a vehicle or a stationary beverage vending machine.

The containing member 20 can receive, hold and dispense a plurality of beverages. For example, the inner surface 24 of the exemplary containing member 20 is cylindrical and can be sized to correspond to a beverage container such as a can. Beverage cans may be inserted in the upper open end of the first wall 22 (adjacent the second outlet 70). The lower end of the first wall 22 (adjacent the second inlet 68) can be operable to selectively open to dispense a beverage can. For example, the lower end of the first wall 22 can include a hinged door or a sliding plate to keep the lower end generally closed and to open to dispense a beverage in response to a command from a controller. The hinged door or sliding plate would be moveable by a controllable actuator. The first wall 22 can be extend a predetermined length corresponding to a plurality of beverage cans.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for moving thermal energy with respect to at least one of a beverage and a food product positioned in one of a vehicle and a stationary vending machine comprising:

a vortex tube positionable in one of a vehicle and a stationary vending machine and having an inlet and a cold outlet and a hot outlet for dividing a primary air stream received in said inlet into a cold air sub-stream exiting said cold outlet and an a hot air sub-stream exiting said hot outlet;

a containing member having a first wall with an inner surface for receiving a product and a second wall surrounding said first wall to define a first cavity;

a first fluid line extending between said first cavity and one of said cold and hot outlets for communicating one of the cold and hot air sub-streams to said first cavity; and a third wall disposed between said first and second walls for dividing said first cavity into outer sub-cavity for receiving the air sub-stream and an inner sub-cavity for receiving a thermal fluid;

wherein said containing member furthering comprises:

an opening communicating with said inner sub-cavity for directing the thermal fluid to said inner sub-cavity; and an exit port spaced from said first inlet and communicating with said inner sub-cavity for directing the thermal fluid from said inner sub-cavity.

2. The apparatus of claim 1 further comprising:

a water separator operably disposed upstream of said inlet to remove water from the primary air stream.

3. An apparatus for moving thermal energy with respect to at least one of a beverage and a food product positioned in one of a vehicle and a stationary vending machine comprising:

a vortex tube positionable in one of a vehicle and a stationary vending machine and having an inlet and a cold outlet and a hot outlet for dividing a primary air stream received in said inlet into a cold air substream exiting said cold outlet and an a hot air sub-stream exiting said hot outlet;

a containing member having a first wall with an inner surface for receiving a product and a second wall surrounding said first wall to define a first cavity;

a first fluid line extending between said first cavity and one of said cold and hot outlets for communicating one of the cold and hot air sub-streams to said first cavity;

a third wall disposed between said first and second walls for dividing said first cavity into outer sub-cavity far receiving the air sub-stream and an inner sub-cavit for receiving a thermal fluid;

a second fluid line having first and second ends and extending away from said outer sub-cavity at said first end for connnunicating the received air sub-stream from said outer sub-cavity;

a mixing chamber engaged with said second fluid line at said second end for receiving the received air sub-stream and having an aperture communicating with ambient air for mixing the received air sub-stream with ambient air; and a third fluid line extending away from said mixing chamber for communicating a mixture of ambient air and the received air sub-stream to said inlet.

4. The apparatus of claim 1 further comprising:

a helical fin extending around said third wall in said outer sub-cavity.

5. The apparatus of claim 4 wherein said containing member furthering comprises:

a second inlet communicating with said outer sub-cavity for directing the received air sub-stream to said outer sub-cavity; and a second outlet spaced from said second inlet and communicating with said outer sub-cavity for directing the received air sub-stream from said outer sub-cavity, wherein said helical fin directs the received air sub-stream between said second inlet and said second outlet.

6. The apparatus of claim 1 further comprising:

an air directing device operably connected to said vortex tube for directing the primary air stream to said inlet of said vortex tube.

7. The apparatus of claim 6 wherein said air directing device is further defined as being a compressor mountable in a vehicle.

* * * * *